(12) United States Patent
Davison et al.

(10) Patent No.: US 6,834,214 B2
(45) Date of Patent: Dec. 21, 2004

(54) SYSTEM, METHOD AND COMPUTER-PROGRAM PRODUCT FOR TRANSFERRING A NUMERICAL CONTROL PROGRAM TO THEREBY CONTROL A MACHINE TOOL CONTROLLER

(75) Inventors: Larry A. Davison, Sedgwick, KS (US); Linda M. Manfull, Valley Center, KS (US); Randal K. Geerdes, Wichita, KS (US); David D. Rudiger, Wichita, KS (US); Timothy A. Banta, Wichita, KS (US); Richard L. Wilson, Augusta, KS (US); Randall E. Patten, Rose Hill, KS (US); Rodney L. Benson, Wichita, KS (US)

(73) Assignee: The Boeing Company, Seattle, WA (US)

( * ) Notice: Subject to any disclaimer, the term of this patent is extended or adjusted under 35 U.S.C. 154(b) by 610 days.

(21) Appl. No.: 09/864,496

(22) Filed: May 24, 2001

(65) Prior Publication Data

US 2002/0193905 A1 Dec. 19, 2002

(51) Int. Cl.$^7$ .......................... G06F 19/00; G06F 9/445
(52) U.S. Cl. ..................... 700/181; 700/169; 717/178
(58) Field of Search ................ 700/179–185, 700/18–20, 28, 32, 169, 173–175; 709/220–222; 713/1, 2, 100; 717/100–103, 168–178; 718/102, 105

(56) References Cited

U.S. PATENT DOCUMENTS

| | | | | |
|---|---|---|---|---|
| 4,901,218 A | * | 2/1990 | Cornwell ........................ 700/2 |
| 5,057,755 A | * | 10/1991 | Naka ........................ 318/568.1 |
| 5,266,878 A | * | 11/1993 | Makino et al. ............. 318/571 |
| 5,270,918 A | * | 12/1993 | Seki et al. ..................... 700/86 |
| 5,388,051 A | | 2/1995 | Seki et al. ................... 700/169 |
| 6,021,360 A | * | 2/2000 | Barker et al. ................ 700/174 |
| 6,065,857 A | | 5/2000 | Hazama et al. ............... 700/95 |
| 6,145,022 A | * | 11/2000 | Takizawa et al. ............. 710/10 |

(List continued on next page.)

FOREIGN PATENT DOCUMENTS

EP     1026563 A1 *   8/2000

OTHER PUBLICATIONS

WEBSITE: e–Manufacturing Networks, Inc., *Welcome to e–Manufacturing Networks, Inc.—Machine Internetworking Solutions* (visited Jun. 7, 2001) <http://www.e–manufacturing.com>, 13 total selected pages.
WEBSITE: Quinx, Inc., *Quinx—Originator of Network DNC—Home—english* (last visited Jun. 7, 2001) <http://www.quinx.com/english/home_e.htm>, 11 total selected pages.
WEBSITE: RealVision, Inc., *webDNC* (last visited Jun. 7, 2001) <http://216.122.195.85/Prod06DNC.htm>, 14 total selected pages.

*Primary Examiner*—Maria N. Von Buhr
(74) *Attorney, Agent, or Firm*—Alston & Bird LLP (57) ABSTRACT

A DNC system, method and computer-program product that utilize a wide area network (WAN), such as the Internet, to transfer numerical control (NC) programs to thereby control machine tool controllers is provided. The DNC system consists of at least one central processing element that includes at least one numerical NC program, and a workstation connected to the central processing elements via the WAN for selecting desired NC programs. Additionally, the system includes at least one machine tool controller for receiving the selected NC programs across the WAN from the central processing elements. Based upon the selected NC programs, the machine tool controllers can control the at least one machine tool during a manufacturing process. The system can further include at least one server processing element connected to the central processing elements via the WAN, and electrically connected to the machine tool controllers.

39 Claims, 10 Drawing Sheets

U.S. PATENT DOCUMENTS

| | | | |
|---|---|---|---|
| 6,263,487 B1 * | 7/2001 | Stripf et al. | 717/171 |
| 6,311,101 B1 * | 10/2001 | Kastner | 700/197 |
| 6,449,649 B1 * | 9/2002 | Janay et al. | 709/227 |
| 6,470,377 B1 * | 10/2002 | Sevcik et al. | 709/201 |
| 6,658,316 B1 * | 12/2003 | Mehta et al. | 700/182 |
| 2002/0169850 A1 * | 11/2002 | Batke et al. | 709/218 |

* cited by examiner

Select a Part and then press desired Function Button

[download]    [crossload] — 158    [delete]

| | Part Number | Pkg. | Seq. | OpCode | Tool Code | REV | FWC | MCD Gen | Source | Status |
|---|---|---|---|---|---|---|---|---|---|---|
| ☐ | WEBDNC-33 | 100 | – 1 | 1WYV | QCT1S2 | REV001 | CFEQ | AMI | Database | Held |
| ☐ | WEBDNC-33 | 100 | – 1 | 1WYV | QCT1S2 | REV001 | CFEQ | AMI | PartBin | |
| ☐ | WEBDNC-GL-356T | 1 | – 1 | ZDNC | ZDNC | REV001 | ZDNC | GGL3S1 | Database | Released |
| ☑ | WEBDNC-GL-356T | 1 | – 1 | ZDNC | ZDNC | REV001 | ZDNC | GGL3S1 | PartBin | |
| ☐ | WEBDNC-HL-A6106 | 1 | – 1 | ZDNC | ZDNC | REV001 | ZDNC | LIN6S1 | Database | Released |
| ☐ | WEBDNC-HL-A6106 | 1 | – 1 | ZDNC | ZDNC | REV001 | ZDNC | LIN6S1 | PartBin | |
| ☑ | WEBDNC-IPAC-A6335 | 1 | – 1 | ZDNC | ZDNC | REV001 | ZDNC | BROTU1 | Database | Released |
| ☐ | WEBDNC-NEOS-132W | 1 | – 1 | ZDNC | DNC | REV001 | ZDNC | NEOSDR | Database | Released |
| ☑ | WEBDNC-NEOS-A6612 | 1 | – 1 | ZDNC | DNC | REV001 | ZDNC | NEOSD2 | Database | Released |
| ☐ | WEBDNC-ROBO-A6914 | 1 | – * | ZDNC | ZDNC | REV001 | ZDNC | ROBPGL | Database | Released |

154                          152

[Tips]  [Help Desk]
[Logout]

[ Inside   | Site Home | Feedback ]

| | Select a Part and then press desired Function Button | | | | | | | | |
|---|---|---|---|---|---|---|---|---|---|
| | download | | | crossload | | | | delete | |
| | Part Number | Pkg. Seq. | OpCode | Tool Code | REV | FWC | MCD Gen | Source | Status |
| ☐ | WEBDNC-33 | 100 – 1 | 1WYV | QCT1S2 | REV001 | CFEQ | AMI | Database | Held |
| ☐ | WEBDNC-33 | 100 – 1 | 1WYV | QCT1S2 | REV001 | CFEQ | AMI | PartBin | |
| ☐ | WEBDNC-GL-356T | 1 – 1 | ZDNC | ZDNC | REV001 | ZDNC | GGL3S1 | Database | Released |
| ☐ | WEBDNC-GL-356T | 1 – 1 | ZDNC | ZDNC | REV001 | ZDNC | GGL3S1 | PartBin | Crossloaded |
| ☐ | WEBDNC-HL-A6106 | 1 – 1 | ZDNC | ZDNC | REV001 | ZDNC | LIN6S1 | Database | Released |
| ☐ | WEBDNC-HL-A6106 | 1 – 1 | ZDNC | ZDNC | REV001 | ZDNC | LIN6S1 | PartBin | |
| ☐ | WEBDNC-IPAC-A6335 | 1 – 1 | ZDNC | ZDNC | REV001 | ZDNC | BROTU1 | Database | Released |
| ☐ | WEBDNC-NEOS-132W | 1 – 1 | ZDNC | DNC | REV001 | ZDNC | NEOSDR | Database | Released |
| ☐ | WEBDNC-NEOS-A6612 | 1 – 1 | ZDNC | DNC | REV001 | ZDNC | NEOSD2 | Database | Released |
| ☐ | WEBDNC-ROBO-A6914 | 1 – * | ZDNC | ZDNC | REV001 | ZDNC | ROBPOL | Database | Released |

Tips   Help Desk
Logout

[ Inside   | Site Home | Feedback ]

SYSTEM, METHOD AND COMPUTER-PROGRAM PRODUCT FOR TRANSFERRING A NUMERICAL CONTROL PROGRAM TO THEREBY CONTROL A MACHINE TOOL CONTROLLER

FIELD OF THE INVENTION

The present invention relates generally to distributed numerical control systems and associated methods and, particularly, to systems and methods for transferring a numerical control program to thereby control a machine tool controller.

BACKGROUND OF THE INVENTION

In many manufacturing processes today, computer-aided manufacturing (CAM) systems allow machine tools to manufacture parts without a lot of manual interaction. Generally, in CAM systems, once the planning and arrangement of machine tools for a particular manufacturing process have been set up, machining the parts can proceed automatically, often untouched by human hands. One part of most CAM systems is a process called numerical control (NC), in which instructions are coded into computer programs, called NC programs, that the machine tools use to guide them in the machining sequence.

Figure 1:
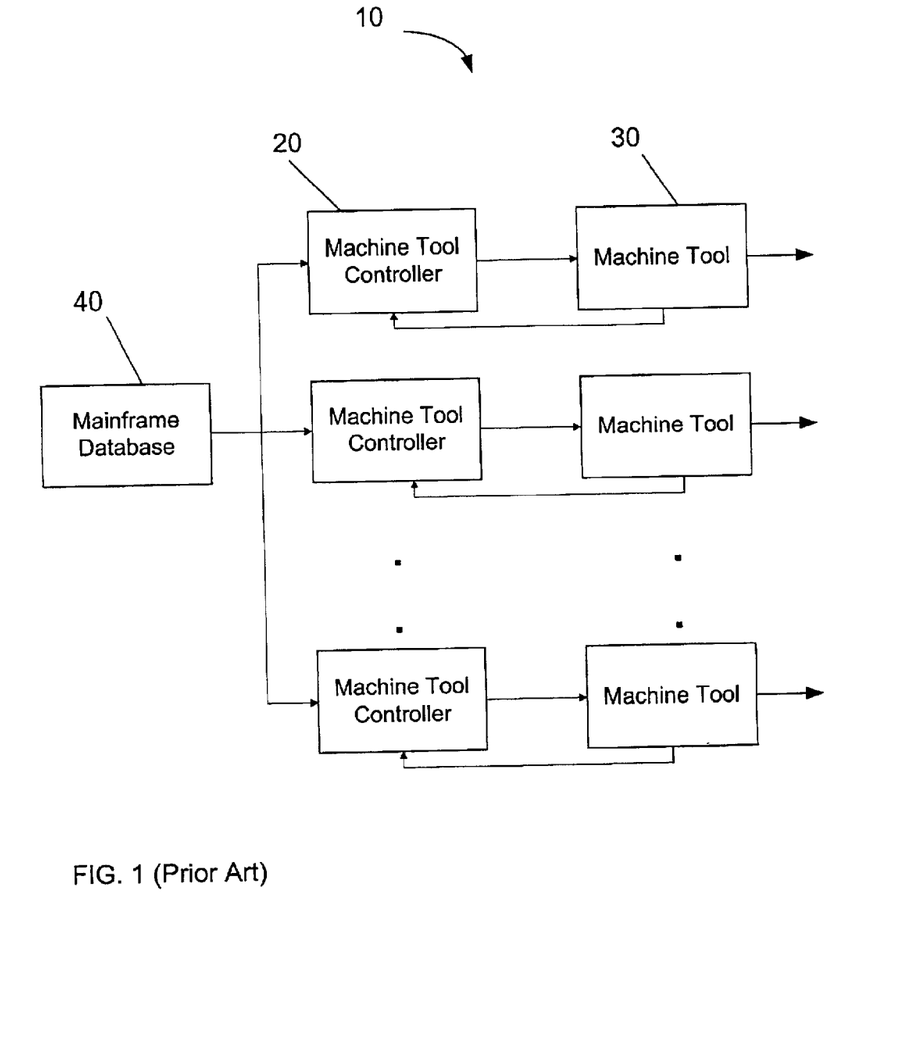
FIG. 1 is a schematic block diagram illustrating a conventional DNC system.

Generally, a CAM system 10 is a closed-loop system that consist of NC programs, machine tool controllers 20 and the machine tools 30, as illustrated in FIG. 1. The machine tool controllers input the NC programs and decode the coded data into a format to thereby control the machine tools in the machining processes. Feedback loops from the machine tools to the machine tool controllers permit errors in the operations of the machine tools to be sensed by the machine tool controllers such that the machine tool controllers can adjust the operations of the machine tools to correct the errors.

In many complex manufacturing companies, multiple machine tool controllers within a machine shop are connected to a central mainframe database 40 over dedicated communication systems, such as serial communication, block transfer read communication or local area network (LAN) communication, to form a direct numerical control (DNC) system. In conventional DNC systems, the NC programs are housed within the mainframe database and are transferred to the various machine tool controllers, as desired. In this regard, proprietary computer software systems, such as TrueDNC distributed by Thedra Technologies, Inc. of Troy, Mich., can be operated from the mainframe database to transfer the NC programs to the connected machine tool controllers. Additionally, DNC systems can be used to transfer NC programs from machine tool controllers back to the central mainframe database, such as when a NC program has been edited at the machine tool controller.

While conventional DNC systems are adequate to control machine tool controllers within a single shop, they have several drawbacks. First, because the machine tool controllers of conventional DNC systems are connected to the mainframe database over dedicated communication systems, the distance over which the mainframe database can transfer the NC programs is typically limited. As manufacturing companies become more complex, many operate several shops often separated by great distances. For example, one manufacturing company could have one shop in California and a second shop in Pennsylvania. In such an instance, a NC program on a mainframe database in one shop could not be transferred to a machine tool controller in the second shop. Instead, a duplicate of the NC program would have to be maintained on a mainframe database in the second shop.

Second, conventional DNC systems typically require expensive proprietary computer software systems to transfer the NC programs back and forth between the mainframe database and the machine tool controllers. These computer software systems can generally only operate on a single mainframe database, typically requiring separate software licenses to operate on multiple mainframe databases located at different shops throughout a manufacturing company. Additionally, these computer software systems can typically only operate according to a format specific compatible with the machine tool controller controlled, requiring a reformatted software system, or a different software system, to operate machine tool controllers compatible with different formats.

SUMMARY OF THE INVENTION

In light of the foregoing background, the present invention provides an improved DNC system, method and computer-program product that utilize a wide area network (WAN), such as the Internet, to transfer NC programs to thereby control machine tool controllers. The DNC system of the present invention allows a user to select, from one location, NC programs from mainframe databases located at another location and thereafter transfer the selected NC programs to machine tool controllers located at a third location. Using the WAN to transfer the NC programs, the DNC system of the present invention overcomes the limited transfer range of conventional DNC systems.

In one embodiment, the DNC system of the present invention consists of at least one central processing element, such as a universal mainframe database, that includes the NC programs. By controlling machine tool controllers over the WAN, the DNC system of the present invention can control machine tool controllers located in different shops using one mainframe database, if so desired, in contrast to a mainframe database for each shop as required by conventional DNC systems. The system also includes a workstation connected to the central processing elements via the WAN. Additionally, the system includes at least one machine tool controller for receiving the selected NC programs across the WAN from the central processing elements. Based upon the selected NC programs, the machine tool controllers can control at least one machine tool during a manufacturing process.

In another embodiment, the system further includes at least one server processing element, such as a mainframe database local to specific shops. In this regard, the system allows the NC programs to be first transferred from the central processing elements to a shop local to the desired machine tool controllers before transferring the NC programs to the machine tool controllers, such as to account for scheduled maintenance shutdown periods of the central processing elements. The server processing elements are connected to the central processing elements via the WAN so that the central processing elements are capable of transferring the selected NC programs to the server processing elements. The server processing elements, in turn, are connected to the machine tool controllers so that the server processing elements are capable of transferring the selected NC programs to the machine tool controllers.

In a further embodiment, each central processing element includes a database that stores the NC programs and that operates according to a predetermined platform. In this embodiment, the workstation is capable of communicating with the database of each respective central processing element according to the respective platform in order to transfer the at least one NC program. In this regard, the system of the present invention is platform independent, such that the workstation can select and communicate with different mainframe databases that may each operate according to different platforms.

In operation, the NC programs are transferred via the WAN by first selecting the NC programs from the workstation. Then, via the WAN, the workstation notifies at least one of the central processing elements of the selected NC programs so the central processing elements can transfer the NC programs. In embodiments where the central processing elements each include a database operating according to a predetermined platform, the workstation communicates with the database of each respective central processing element according to the platform in order to notify the respective central processing element to of the selected NC programs to transfer. The notified central processing elements then transfer the selected NC programs across the WAN from the NC programs' respective central processing elements to at least one machine tool controller. In a further embodiment, the NC programs are transferred to the machine tool controllers according to a predetermined protocol, such as a file transfer protocol (FTP). In embodiments including the server processing elements, the selected NC programs can first be transferred from the central processing elements across the WAN to their respective server processing elements. After the server processing elements have received the NC programs, either immediately or after a time period, the server processing elements can transfer the NC programs to their respective machine tool controller.

The machine tool controllers then use the NC programs to control respective machine tools. In one embodiment, each machine tool controller is capable of executing, or decoding, the NC programs according to a predetermined format, such as ASCII. In this embodiment, the selected NC programs are transferred to the machine tool controllers according to the format of each respective machine tool controller. In this regard, the system of the present invention is format independent in that it can transfer NC programs to machine tool controllers executing NC programs according to different formats.

Advantageously, because the workstation can select and transfer NC programs from a workstation located separately from both the mainframe databases and the machine tool controllers, such as between two shops separated by a great distance, the system of the present invention can also be used in conjunction with an enterprise resource planner (ERP) system. In this regard, the present invention provides a method and computer-program product that allows a user to control a plurality machine tool controllers with the NC programs according to a status of each machine tool controller. According to one embodiment, the method for controlling the machine tool controllers begins by selecting at least one machine tool controller from the plurality of machine tool controllers based upon a status of each machine tool. The status of each machine tool controller can be based upon any of a number of different factors, such as an operability status, a current workload status and a future workload status. Using the status of each machine tool controller, a user at the workstation can balance the workloads of the machine tool controllers or select operating machine tool controllers, for example. Then, after the machine tool controllers are selected, the NC programs are selected from the workstation, such as via the WAN. Next, the selected NC programs are transferred from the central processing elements to the selected machine tool controllers to thereby control the selected machine tool controllers.

Therefore, the present invention provides a system, an associated method and a computer-program product that utilize a WAN, such as the Internet, to transfer NC programs to thereby control machine tool controllers. The present invention overcomes the limited transfer range of conventional DNC systems by allowing users to select, from one location, NC programs from mainframe databases located at another location and thereafter transfer the selected NC programs to machine tool controllers located at a third location. The present invention can also operate platform and format independent by providing a workstation and central processing elements that can select, communicate and transfer NC programs depending on the platform and format of the central processing elements and machine tool controllers, respectively. In addition to an improved DNC system, the present invention also provides a new ability for a manufacturing planner, using an ERP system to push NC programs to machine tool controllers. In this regard, the present invention provides a method and computer-program product that allows a user to control a plurality machine tool controllers with the NC programs according to the status of each machine.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2A:
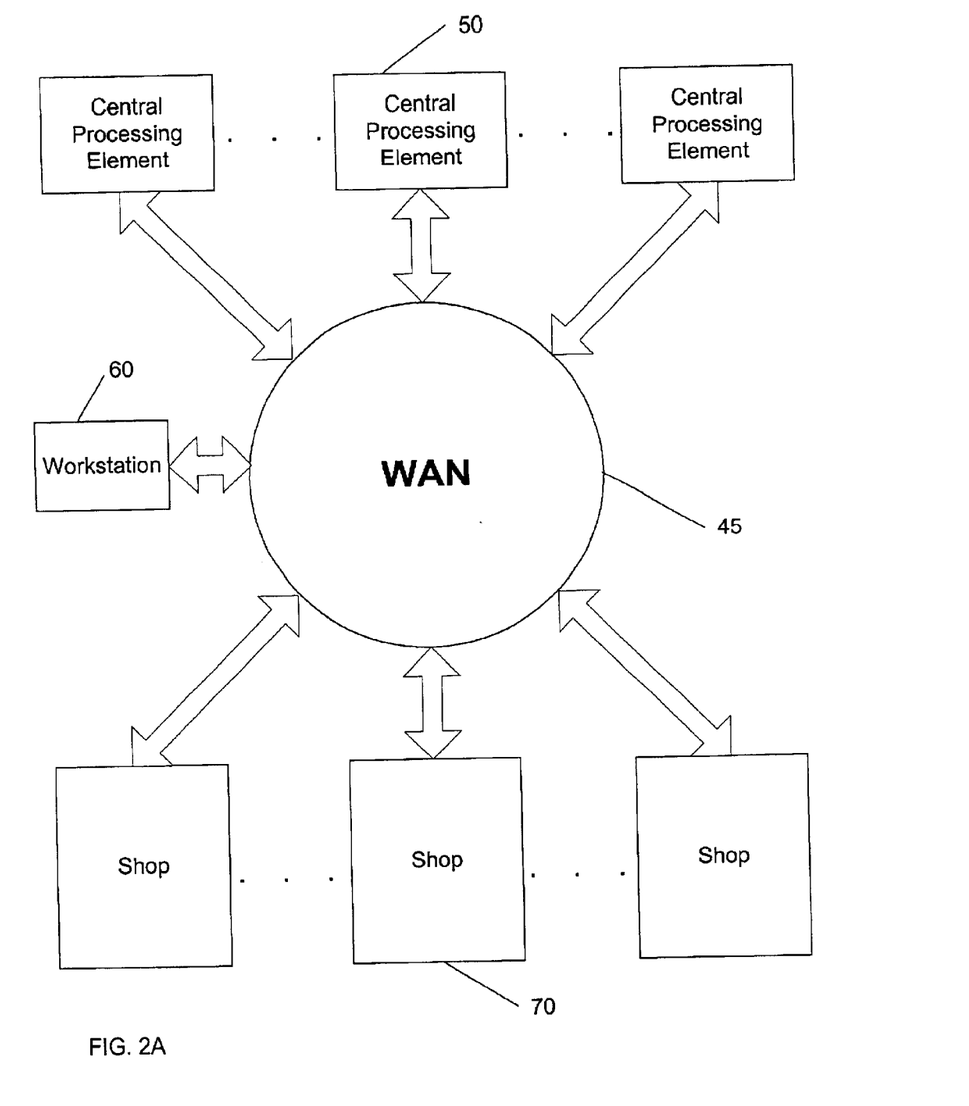
FIG. 2A is a schematic block diagram illustrating the system of the present invention, according to one embodiment.
Figure 2B:
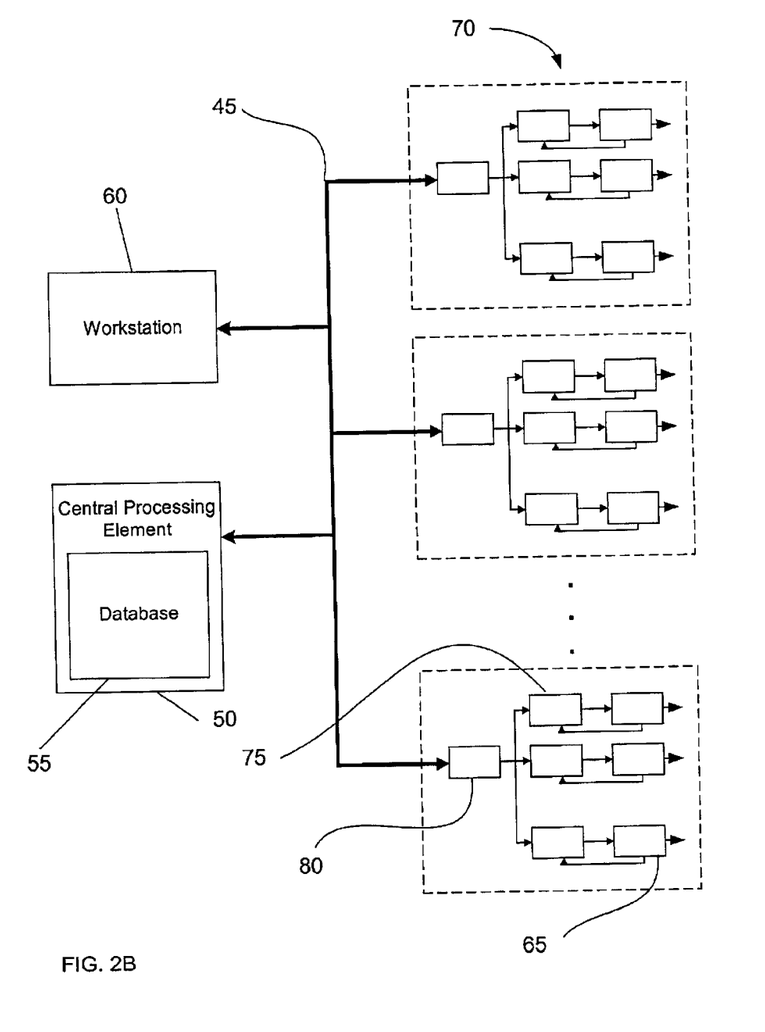
FIG. 2B is a schematic block diagram further illustrating the system illustrated in FIG. 2A, according to one embodiment of the present invention.

Referring to FIGS. 2A and 2B, a system for controlling at least one machine tool with at least one numerical control (NC) program delivered across a wide area network (WAN) 45 is shown. The WAN can comprise a number of different wide area networks, but preferably comprises the Internet. Advantageously, by delivering the NC programs across the WAN, the system of the present invention can control a plurality of different machine tools located in different locations using fewer mainframe databases than required by conventional DNC systems, which require a mainframe database for each shop. In this regard, the system of the present invention includes at least one central processing element 50 (e.g., mainframe database) that includes the NC programs and can transmit the NC programs to the machine tools. Each central processing element can comprise any number of elements, but typically comprise a server computer or other high level processor. Preferably, the central processing elements each include a database 55 for storing the NC programs, such as, for example, any of the DB2 family of databases manufactured by International Business Machines Corporation of Armonk, N.Y., or any of the Oracle family of databases manufactured by Oracle Corporation of Redwood Shores, Calif. The database can operate according to any number of different platforms compatible with the database, as such are known.

The system also includes a workstation 60 in electrical communication with the central processing elements via the WAN. The workstation can be used to control the machine tool controllers by directing the transmission of the NC programs from the central processing elements to the machine tool controllers. The workstation can consist of any of a number of different elements capable of communicating with the central processing elements via the WAN but, preferably, the workstation consists of a personal computer or other high level processor. The workstation is adapted to communicate with the central processing elements, which may operate according to a multiplicity of different platforms, typically depending upon the database of the respective central processing element. In this regard, the system of the present invention is platform independent such that the workstation can select and communicate with the databases of different central processing elements that may each operate according to different platforms. Although FIGS. 2A and 2B illustrate only a single workstation connected to one or more central processing elements, it should be understood that the system can include a plurality of workstations connected to a plurality of the same, or different, central processing elements without departing from the spirit and scope of the present invention.

The system also includes at least one machine tool 65, typically located in a factory or shop 70 from which the machine tools are used in a manufacturing process. The central processing elements 50, workstation 60 and shops can be located proximate one another but, advantageously, the central processing elements, workstation and shops can be located remote from one another. In this regard, by using the WAN, the system of the present invention allows a user to select, from one location (e.g., the workstation), NC programs located at a second location (e.g., central processing elements), and thereafter transfer the selected NC programs to a third location (e.g., shops) to control the machine tools.

To control the at least one machine tool 65 with the at least one NC program, the system typically includes at least one machine tool controller 75 electrically connected to a respective machine tool. Depending on the manufacturing process, the machine tool controllers can consist of any of a number of different well known devices. The machine tool controllers receive the NC programs from the central processing elements 50 and decode the NC programs to thereby control the operation of the machine tools. The central processing elements and machine tool controllers communicate to transmit and receive the NC programs according to a predetermined protocol such as, for example, a file transfer protocol (FTP). Additionally, the machine tool controllers are capable of executing the NC programs to thereby decode the NC programs according to any of a number of different formats, such as an ASCII format or an EIA format, set in a machine tool controller specific syntax. In this regard, the central processing elements are capable of transmitting the NC programs according to the format of the respective machine tool controllers receiving the NC programs.

Although not necessary for the operation of the present invention, the system can further include at least one server processing element 80 in communication with the central processing elements 50 via the WAN and electrically connected to respective machine tool controllers 60. The server processing elements can be electrically connected to the respective machine tool controllers via any of a number of different manners, such as through a local area network (LAN) using FTP, serial, or parallel communications. Each server processing elements can comprise any of a number of different elements but, typically, comprise a server computer or other high level processor. The server processing elements are capable of receiving the NC programs and storing the NC programs for transfer to the machine tool controllers, immediately or after a time period. In this regard, although not illustrated, each server processing element can include a server database, such as, for example, any of the DB2 family of databases or any of the Oracle family of databases. The server database can operate according to any number of different platforms compatible with the database, as such are known.

The server processing element 80 allows the system to operate during times when the central processing elements 50 cannot transfer NC programs to the machine tool controllers 75, such as during scheduled maintenance shutdown periods. For example, if the central processing elements are scheduled to shutdown every Sunday for maintenance, the NC programs can be transferred to and stored by the server processing elements at any time prior to the Sunday shutdown to thereby allow the machine tool controllers to operate according to the stored NC programs during the Sunday shutdown period. Also, while the central processing elements and server processing elements are illustrated as separate elements, it should be understood that the central processing elements and server processing elements can be the same element. In this regard, a server processing element in one shop can transfer a stored NC program to a machine tool controller (or another server processing element) located in another shop, as directed by the workstation.

Figure 3:
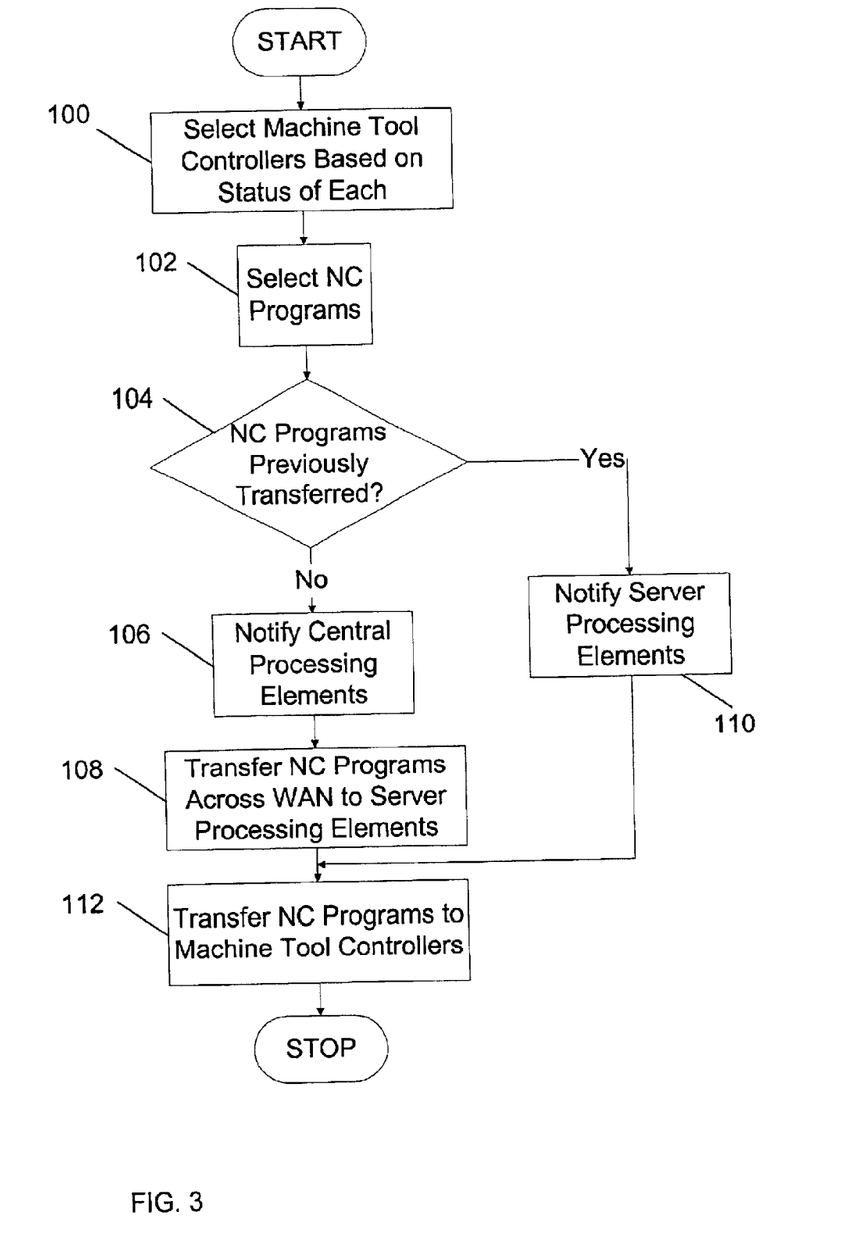
FIG. 3 is a flow diagram illustrating a method of transferring NC programs via a wide area network, according to one embodiment of the present invention.
Figure 4A:
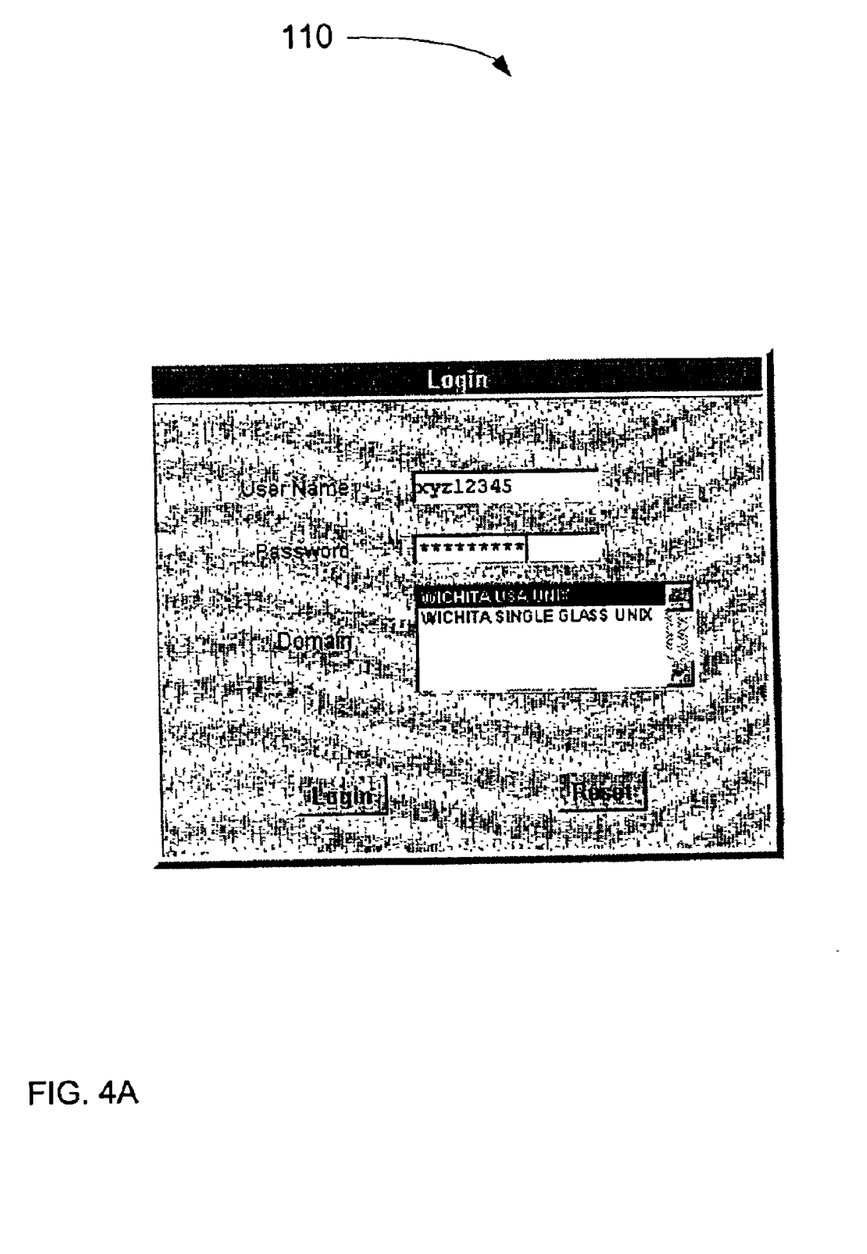
FIG. 4A-4F are schematic diagrams of electronic, interactive displays illustrating various steps in the method of transferring the NC programs, according to one embodiment of the present invention.
Figure 4B:
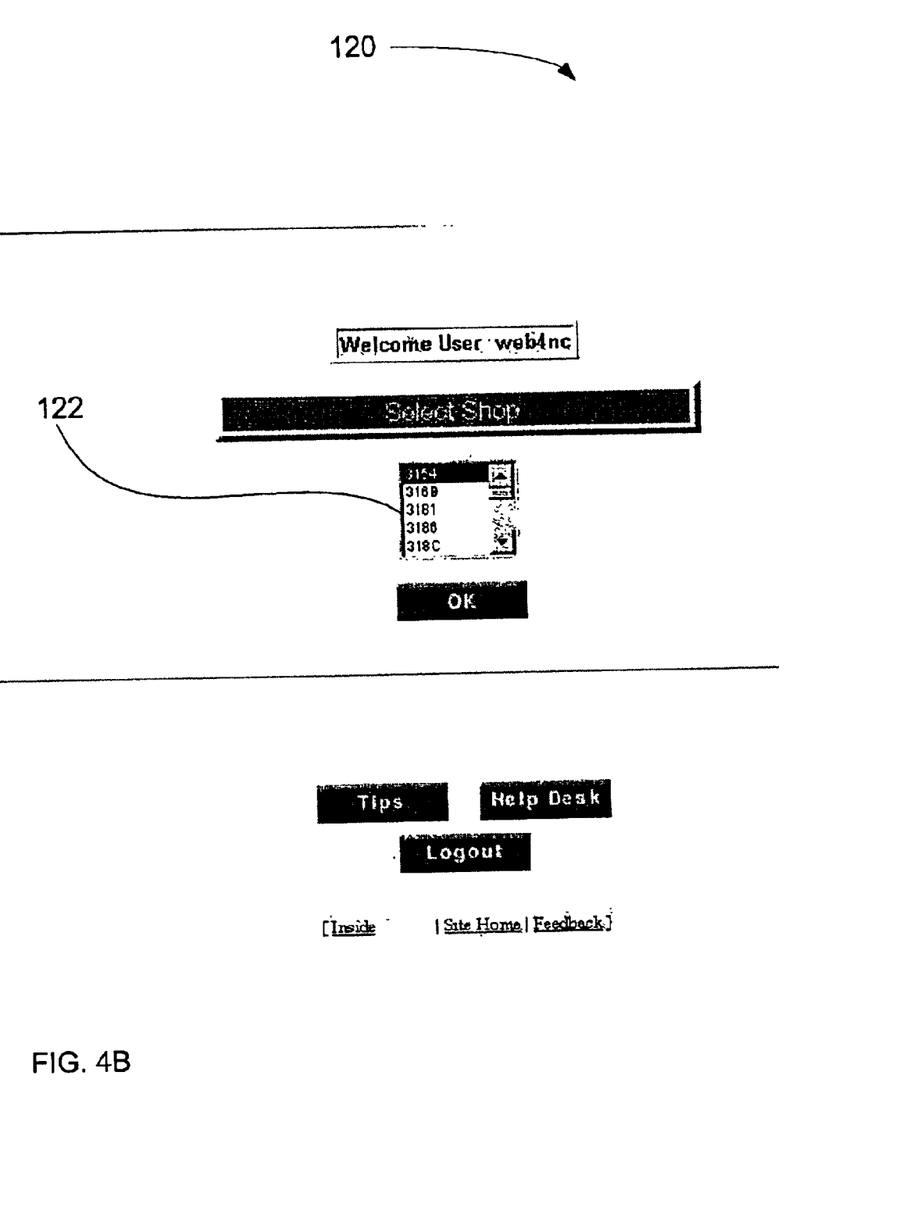
Figure 4C:
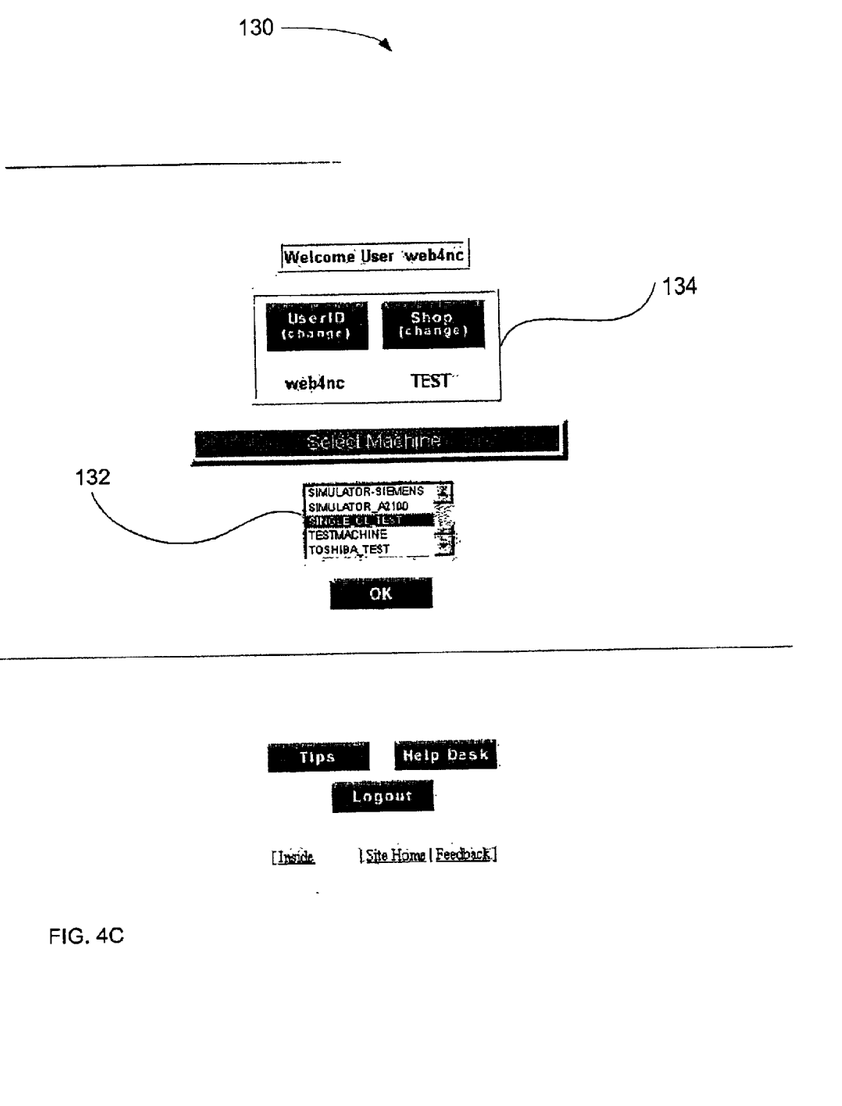

Referring now to FIGS. 3 and 4A–4F, in operation, during a manufacturing process at least one NC program is desired to operate one or more particular machine tools to produce a desired product. As such, a user selects the desired NC programs from the workstation. In this regard, the workstation can include an electronic, interactive display, such as an active Internet page. The interactive display can be implemented according to any of a number of different methods including, for example, the JAVA programming language developed by Sun Microsystems, Inc. of Palo Alto, Calif. As illustrated in FIG. 4A, the system can first require the user to log into the workstation, such as from a log in display 110. In this regard, only authorized users can transfer the NC programs to operate the machine tools. After logging in to the workstation, the user can then select, from a shop select display 120, a shop from which to select the particular machine tools to produce the desired product, such as from a shop scroll-down menu 122 of available shops, as shown in FIG. 4B. From a machine select display 130, the user can select the particular machines to operate to produce the desired product, such as from a machine tool scroll-down menu 132, as illustrated by FIG. 4C. Additionally, if the user decides to change any of the previous selections, such as the identified user or the selected shop, the user can elect make the change, such as from a criteria menu 134.

Utilizing the shop select display 120 and the machine select 130 display, the user can select and transfer NC programs from a workstation located separately from both the mainframe databases and the machine tool controllers, such as between two shops separated by a great distance. The system of the present invention can also be used in conjunction with an enterprise resource planner (ERP) system. In this regard, the user can select the machine tool controllers according to a status of each respective machine tool controller (FIG. 3, block 100). The status of each machine tool controller can be based upon any of a number of different factors, such as an operability status based upon whether the machine tool controller is currently in operation, a current workload status and a future workload status of the machine tool controller. The user can select the machine tool controllers based upon the status according to any of a number of different methods, as such are known. For example, a computer software system, such as any number of software programs in the Open Shopfloor family of products developed by Siemens AG of Munich, Germany, could provide the status of the machine tool controllers controlling the machine tools in the selected shop. Additionally, or alternatively, the status of the machine tool controllers can be acquired manually such as by a shop floor operator, and thereafter communicated to the user of the workstation. By selecting each machine tool based on a status of the respective machine tool controller, a manufacturing planner can balance the workloads of the machine tool controllers or select operating machine tool controllers, for example.

Figure 4D:
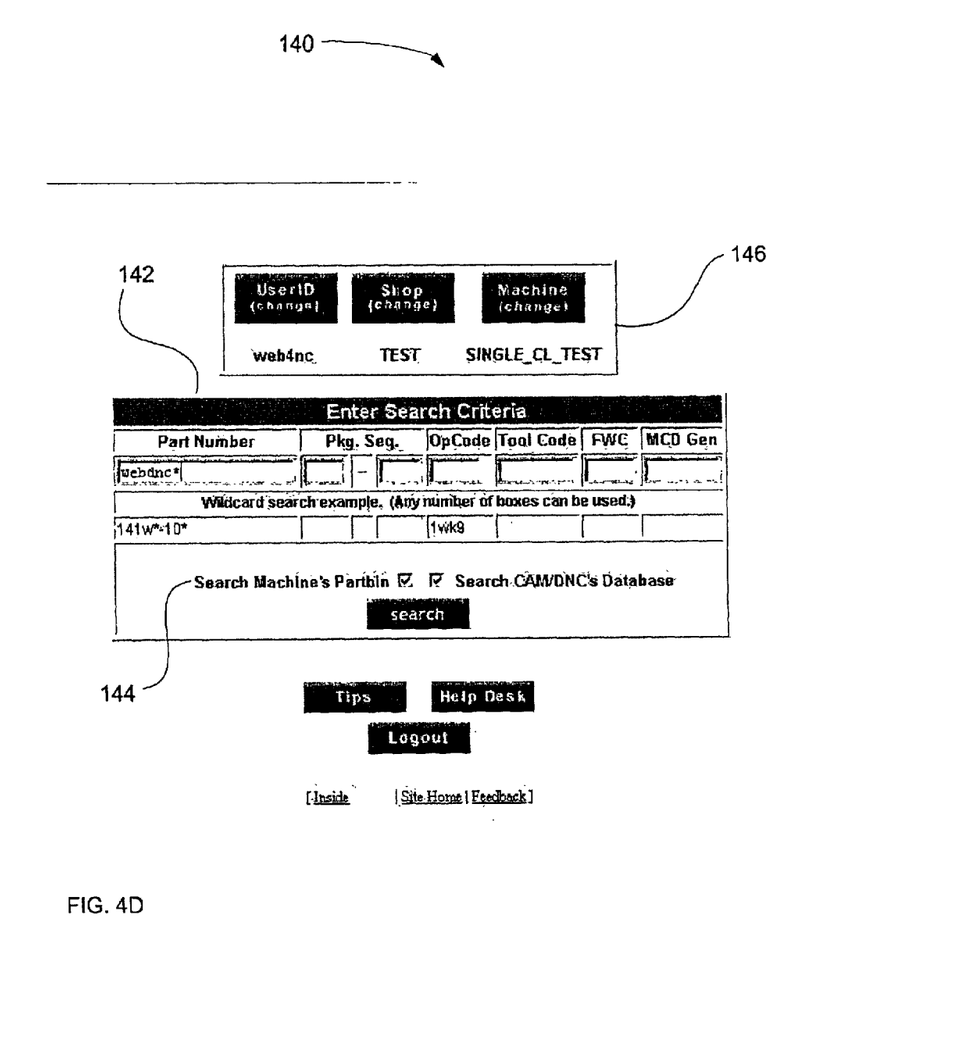

As shown in FIG. 4D, after the user has selected the particular machine tools, the user selects the NC programs to transfer to the machine tool controllers or, more particularly, the server processing elements, typically by selecting the desired products produced with the selected NC programs or, more particularly, particular parts produced with the selected NC programs which form portions of the desired products (block 102). In this regard, the user is presented with a part select display 140 that includes a part search field 142. From the part search field, the user can enter information identifying a part such as, for example, a part number or a portion of a part number. Additionally, the user can choose to search for the NC programs from the respective central processing element and/or the respective server processing element, such as from a checkbox select 144 of the desired processing element(s). In this regard, the server processing element may have previously stored the desired NC programs, such as to account for a shutdown period of the central processing element. Also, as with the machine select display, the user can change the previously selected criteria, such as from an additional criteria menu 146 including, for example, the identified user, the selected shop or the selected machine tool.

Figure 4E:
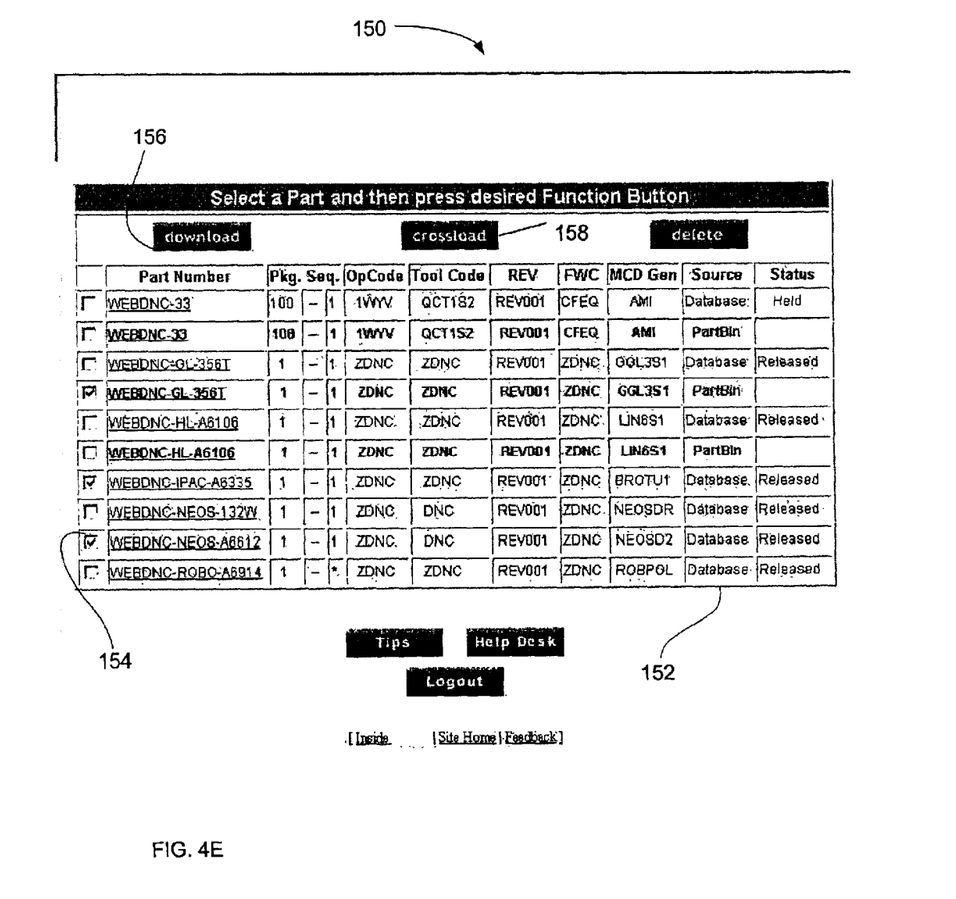

As shown in FIG. 4E, from the information identifying the part, the workstation can present the user with a list of parts matching the information entered into the part search field, such as from a part list display 150. Additionally, the list of parts presented are associated with NC programs in a format compatible with the previously selected machine tool controller, such as ASCII. In this regard, the central processing elements and/or server processing elements can include NC programs of varying formats, depending upon which machine tool controllers are compatible with the respective format of the NC programs. The part display list includes a listing of all the parts matching the information entered along with additional identifying information regarding the displayed parts. For example, the display list can include a location field 152 including information related to the location of the NC program used to manufacture the listed part, whether the respective central processing element (i.e., Database) or the respective server processing element (i.e., PartBin). The part display list also includes part select fields 154, such as checkbox selects, for selecting desired parts from the listing of matching parts and, thus, the desired NC programs.

After the user has selected the desired NC programs, unless the NC programs have previously been transferred to the respective server processing element, the workstation communicates, via the WAN, with the central processing elements that include the respective databases storing the desired NC programs (blocks 104 and 106). In this regard, the part list display 150 can include a download select 156 to begin communication between the workstation and the respective central processing elements. The workstation communicates according to the platform of the respective databases to thereby notify the databases of the user's selections. Next, the respective databases transfer the desired NC programs across the WAN to the respective server processing elements at the factories or shops where the respective machine tools are located (block 108), unless the NC programs have previously been transferred.

If the user desires to transfer the NC programs from the central processing elements directly through the server processing elements to the machine tool controllers, or if NC programs have previously been transferred to the server processing elements, the part list display 150 can include a crossload select 158 to begin communication with the respective central processing elements or server processing elements to thereby notify the central processing elements or server processing elements to transfer the NC programs to the machine tool controllers (FIG. 3, block 110). In this regard, the server processing elements can store the NC programs for transfer at a later time. By storing the NC programs for later transfer, the server processing elements allow the control of the machine tool controllers to continue during times when the central processing elements are unable to transfer the NC programs, such as during a shutdown period of the respective central processing elements.

Figure 4F:
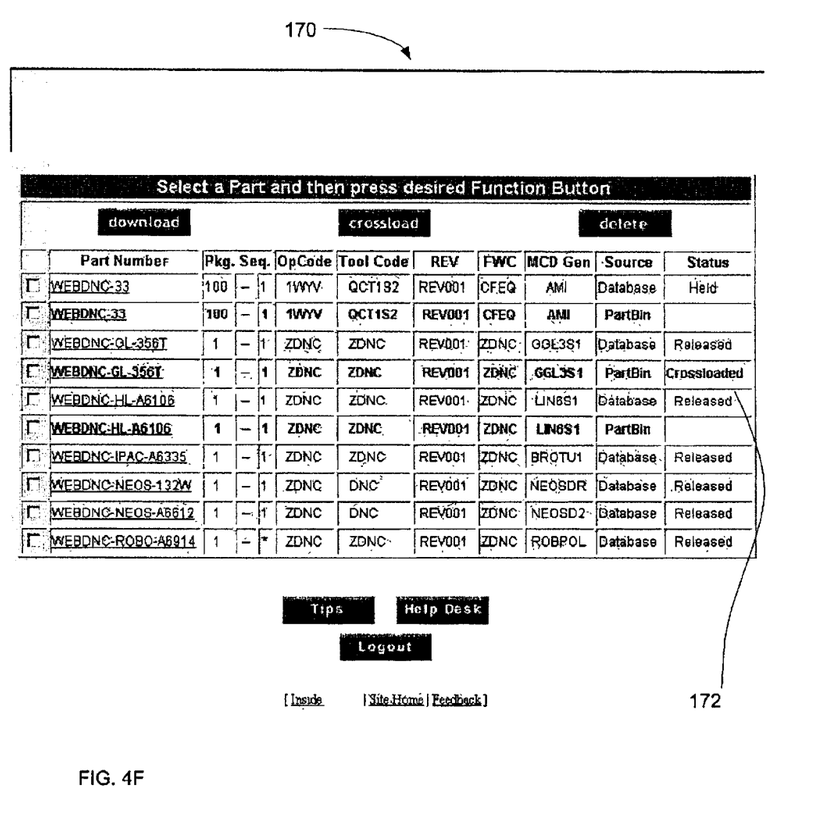

After transferring the NC programs to the server processing elements or after notifying the server processing elements to transfer the NC programs, the server processing elements transfer the NC programs to the respective machine tool controllers to thereby control the machine tools to produce a desired product (block 108). As such, the user at the workstation can be presented with an action complete display 170 indicating that the NC programs for the desired part have been downloaded to the respective server processing element, or crossloaded 172 to the respective machine tool controller, as shown in FIG. 4F. The NC programs are transferred to the machine tool controllers according to a predetermined protocol compatible with the respective machine tool controllers, such as FTP. Additionally, the NC programs are transferred to the machine tool controllers according to a predetermined format compatible with the respective machine tool controller, such as ASCII. In this regard, the NC programs can either be transferred from the central processing elements in the predetermined format, or formatted into the predetermined format at the respective server processing element.

In one advantageous embodiment, portions of the method of the present invention, such as portions of selecting the at least one machine tool controller, selecting the at least one NC program and transferring the at least one NC program, include a computer program product. The computer program product includes a computer-readable storage medium, such as the non-volatile storage medium, and computer-readable program code portions, such as a series of computer instructions, embodied in the computer-readable storage medium for selecting the at least one machine tool controller and selecting the at least one NC program. Typically, the computer program is stored by the workstation, central processing element or a related memory device, such as a non-volatile storage device, and is executed by a personal computer or other high level processor.

In this regard, FIG. 3 is a block diagram, flowchart and control flow illustration of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustration support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions.

Therefore, the present invention provides a system and associated method and computer-program product that utilize a WAN, such as the Internet, to transfer NC programs to thereby control machine tool controllers to control machine tools to produce a product. The present invention overcomes the limited transfer range of conventional DNC systems by allowing users to select, from one location, NC programs from mainframe databases located at another location and thereafter transfer the selected NC programs to machine tool controllers located at a third location. The present invention can operate platform and format independent. Additionally, the present invention provides an adjunct to an ERP system that allows a user to control a plurality machine tool controllers with the NC programs according to the status of each machine.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of transferring at least one numerical control (NC) program via a wide area network (WAN) comprising:

selecting at least one machine tool controller from a workstation, wherein at least one machine tool controller is selected based upon at least one status of each machine tool controller;

selecting the at least one NC program from the workstation;

notifying at least one central processing element of the selected at least one NC program via the WAN, the at least one central processing element including the at least one NC program; and transferring the selected at least one NC program across the WAN from the at least one central processing element to the selected at least one machine tool controller, wherein the at least one machine tool controller is electrically connected to a machine tool.

2. A method according to claim 1, wherein selecting the at least one NC program comprises selecting the at least one NC program from a workstation electrically connected to the at least one central processing element via the Internet, and wherein transferring the selected at least one NC program comprises transferring the selected at least one NC program across the Internet.

3. A method according to claim 1, wherein transferring the selected at least one NC program comprises transferring the at least one NC program according to a predetermined protocol.

4. A method according to claim 1 further comprising transferring the selected at least one NC program from the at least one central processing element to at least one server processing element across the WAN before transferring the selected at least one NC program to the at least one machine tool controller, and wherein transferring the selected at least one NC program to the at least one machine tool controller comprises transferring the selected at least one NC program from the at least one server processing element to the at least one machine tool controller.

5. A method according to claim 4, wherein transferring the selected at least one NC program to the at least one machine tool controller comprises transferring the at least one NC program to the at least one machine tool controller according to a predetermined protocol.

6. A method according to claim 1, wherein selecting at least one machine tool controller comprises selecting at least one machine tool controller based upon at least one status of each machine tool controller selected from a group consisting of an operability status, a current workload status and a future workload status, and thereafter selecting the at least one NC program.

7. A method according to claim 1, wherein each central processing element comprises a database that stores the at least one NC program and that operates according to a predetermined platform, and wherein transferring the at least one NC program comprises communicating with the database of each respective central processing element according to the respective platform in order to transfer the at least one NC program.

8. A method according to claim 1, wherein each machine tool controller is capable of executing the at least on NC program according to a predetermined format, and wherein transferring the selected at least one NC program comprises transferring the selected at least one NC program to the at least one machine tool controller according to the format of each respective machine tool controller.

9. A system for controlling at least one machine tool with at least one numerical control (NC) program delivered across a wide area network (WAN) comprising:
   at least one central processing element including the at least one NC program;
   at least one machine tool controller adapted to control the at least one machine tool; and
   a workstation electrically connected to the at least one central processing element via the WAN, wherein said workstation is capable of selecting at least one machine tool controller based upon at least one status of each machine tool controller, wherein said workstation is also capable of selecting the at least one NC program; and,
   wherein said selected at least one machine tool controller is capable of receiving the selected at least one NC program across the WAN from said at least one central processing element, said at least one machine tool controller being adapted to control the at least one machine tool based upon the selected at least one NC program.

10. A system according to claim 9, wherein the WAN comprises the Internet.

11. A system according to claim 9, wherein said at least one central processing element is capable of transferring the selected at least one NC program according to a predetermined protocol.

12. A system according to claim 9 further comprising at least one server processing element electrically connected to said at least one central processing element via the WAN, wherein said at least one server processing element is also electrically connected to the at least one machine tool controller, wherein said at least one central processing element is capable of transferring the selected at least one NC program to said at least one server processing element, and wherein said at least one server processing element is capable of transferring the selected at least one NC program to the at least one machine tool controller.

13. A system according to claim 12, wherein said at least one server processing element is capable of transferring the at least one NC program to the at least one machine tool controller according to a predetermined protocol.

14. A system according to claim 9, wherein each central processing element comprises a database that stores the at least one NC program and that operates according to a predetermined platform, and wherein said workstation is capable of communicating with the database of each respective central processing element according to the respective platform in order to transfer the at least one NC program.

15. A system according to claim 9, wherein each machine tool controller is capable of executing the at least on NC program according to a predetermined format, and wherein said at least one central processing element is capable of transferring the selected at least one NC program to the at least one machine tool controller according to the format of each respective machine tool controller.

16. A computer program product for transferring at least one numerical control (NC) program via a wide area network (WAN), the computer program product comprising a computer-readable storage medium having computer-readable program code portions stored therein, the computer-readable program code portions comprising:
   a first executable portion for selecting at least one machine tool controller from a workstation, wherein at least one machine tool controller is selected based upon at least one status of each machine tool controller;
   a second executable portion for selecting the at least one NC program from the workstation;
   a third executable portion for notifying at least one central processing element of the selected at least one NC program via the WAN; and
   a fourth executable portion for transferring the selected at least one NC program across the WAN from the at least one central processing element to the selected at least one machine tool controller, wherein the at least one machine tool controller is electrically connected to at least one machine tool.

17. A computer program product according to claim 16, wherein the at least one central processing element and the workstation are electrically connected via the Internet, and wherein said fourth executable portion is adapted to transfer the selected at least one NC program across the Internet.

18. A computer program product according to claim 16, wherein said fourth executable portion is adapted to transfer the selected at least one NC program according to a predetermined protocol.

19. A computer program product according to claim 16, wherein said fourth executable portion is adapted to transfer the selected at least one NC program to at least one server processing element, said computer program product further comprising a fifth executable portion for transferring the selected at least one NC program from the at least one server processing element to the at least one machine tool controller.

20. A computer program product according to claim 19, wherein said fifth executable portion is adapted to transfer the at least one NC program to the at least one machine tool controller according to a predetermined protocol.

21. A computer program product according to claim 16, wherein said first executable portion is adapted to select the at least one machine tool controller based upon at least one status of each machine tool controller selected from a group consisting of an operability status, a current workload status and a future workload status, and thereafter select the at least one NC program.

22. A computer program product according to claim 16, wherein each central processing element comprises a database that stores the at least one NC program and that operates according to a predetermined platform, and wherein said fourth executable portion is adapted to communicate with the database of each respective central processing element according to the respective platform in order to transfer the at least one NC program.

23. A computer program product according to claim 16, wherein each machine tool controller is capable of executing the at least on NC program according to a predetermined format, and wherein said fourth executable portion is adapted to transfer the selected at least one NC program according to the format of each respective machine tool controller.

24. A method of controlling a plurality of machine tool controllers with at least one numerical control (NC) program, wherein the at least one NC program is stored by at least one central processing element, said method comprising:

selecting the at least one machine tool controller from the plurality of machine tool controllers, wherein the selecting is based upon at least one status of each machine tool controller selected from a group consisting of an operability status, a current workload status and a future workload status;

selecting the at least one NC program from a workstation; and transferring the selected at least one NC program from the at least one central processing element to the selected at least one machine tool controller to thereby control the selected at least one machine tool controller.

25. A method according to claim 24, wherein the workstation is connected to the at least one central processing element via a wide area network (WAN), and wherein transferring the selected at least one NC program comprises transferring the selected at least one NC program across the WAN.

26. A method according to claim 25, wherein selecting the at least one NC program comprises selecting the at least one NC program from the workstation that is electrically connected to the at least one central processing element via the Internet, and wherein transferring the selected at least one NC program comprises transferring the selected at least one NC program across the Internet.

27. A method according to claim 24, wherein transferring the selected at least one NC program comprises transferring the at least one NC program according to a predetermined protocol.

28. A method according to claim 24 further comprising transferring the selected at least one NC program from the at least one central processing element to at least one server processing element before transferring the selected at least one NC program, and wherein transferring the selected at least one NC program comprises transferring the selected at least one NC program from the at least one server processing element to the at least one machine tool controller.

29. A method according to claim 28, wherein transferring the selected at least one NC program comprises transferring the at least one NC program to the selected at least one machine tool controller according to a predetermined protocol.

30. A method according to claim 24, wherein each central processing element comprises a database that stores the at least one NC program and that operates according to a predetermined protocol, and wherein transferring the at least one NC program comprises communicating with the database of each respective central processing element according to the respective protocol in order to transfer the at least one NC program.

31. A method according to claim 24, wherein each machine tool controller is capable of executing the at least one NC program according to a predetermined format, and wherein transferring the selected at least one NC program comprises transferring the selected at least one NC program to the at least one machine tool controller according to the format of each respective machine tool controller.

32. A computer program product for controlling a plurality of machine tool controllers with at least one numerical control (NC) program, wherein the at least one NC program is stored by at least one central processing element, the computer program product comprising a computer-readable storage medium having computer-readable program code portions stored therein, the computer-readable program code portions comprising:

a first executable portion for selecting at least one machine tool controller from the plurality of machine tool controllers, wherein the second executable portion is adapted to select the at least one machine tool controller based upon at least one status of each machine tool controller selected from a group consisting of an operability status, a current workload status and a future workload status;

a second executable portion for selecting the at least one NC program from a workstation; and a third executable portion for transferring the selected at least one NC program from the first processing element to the selected at least one machine tool controller.

33. A computer program product according to claim 32, wherein the workstation is electrically connected to the at least one central processing element via a wide area network (WAN), and wherein said third executable portion is adapted to transfer the selected at least one NC program across the WAN.

34. A computer program product according to claim 33, wherein the at least one central processing element and the workstation are electrically connected via the Internet, and wherein said third executable portion is adapted to transfer the selected at least one NC program across the Internet.

35. A computer program product according to claim 32, wherein said third executable portion is adapted to transfer the selected at least one NC program according to a predetermined protocol.

36. A computer program product according to claim 32, wherein said third executable portion is adapted to transfer the selected at least one NC program to at least one server processing element, said computer program product further comprising a fourth executable portion for transferring the selected at least one NC program from the at least one server processing element to the selected at least one machine tool controller.

37. A computer program product according to claim 36, wherein said fourth executable portion is adapted to transfer the at least one NC program to the selected at least one machine tool controller according to a predetermined protocol.

38. A computer program product according to claim 32, wherein each central processing element comprises a database that stores the at least one NC program and that operates according to at least one platform, and wherein said third executable portion is adapted to communicate with the database of each respective central processing element according to the respective platform in order to transfer the at least one NC program.

39. A computer program product according to claim 32, wherein each machine tool controller is capable of executing the at least on NC program according to a predetermined format, and wherein said third executable portion is adapted to transfer the selected at least one NC program to the at least one machine tool controller according to the format of each respective machine tool controller.

* * * * *